(12) United States Patent
MacCarthaigh

(10) Patent No.: US 9,288,153 B2
(45) Date of Patent: *Mar. 15, 2016

(54) PROCESSING ENCODED CONTENT

(71) Applicant: Amazon Technologies, Inc., Reno, NV (US)

(72) Inventor: Colm MacCarthaigh, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/304,011

(22) Filed: Jun. 13, 2014

(65) Prior Publication Data

US 2015/0019734 A1 Jan. 15, 2015

Related U.S. Application Data

(63) Continuation of application No. 12/869,664, filed on Aug. 26, 2010, now Pat. No. 8,756,272.

(51) Int. Cl.
*G06F 15/173* (2006.01)
*H04L 12/863* (2013.01)
(Continued)

(52) U.S. Cl.
CPC ............ *H04L 47/622* (2013.01); *H04L 47/741* (2013.01); *H04L 65/4084* (2013.01); *H04L 67/2842* (2013.01)

(58) Field of Classification Search
CPC .................................................. H04L 65/4084
USPC .................................................. 709/223, 225
See application file for complete search history.

(56) References Cited

U.S. PATENT DOCUMENTS 5,341,477 A  8/1994 Pitkin et al.
5,774,660 A  6/1998 Brendel et al.
(Continued)

FOREIGN PATENT DOCUMENTS

CN  1422468 A  6/2003
CN  1605182 A  4/2005
(Continued)

OTHER PUBLICATIONS

"Global Server Load Balancing with ServerIron," Foundry Networks, retrieved Aug. 30, 2007, from http://www.foundrynet.com/pdf/an-global-server-load-bal.pdf, 7 pages.
(Continued)

*Primary Examiner* — Adnan Mirza
(74) *Attorney, Agent, or Firm* — Knobbe, Martens, Olson & Bear, LLP

(57) ABSTRACT

A system and method for the management of client computing device content requests by service providers are provided. The requested content corresponds to content organized as a series of ordered frames, which include a number of reference frames. The management of the content requests can include the selection of computing devices corresponding to various Point of Presence locations for providing requested content. The selection of the computing devices can incorporate logic related to the delivery of a first subset of the content from a Point of Presence based on minimizing delivery latencies. The selection of the computing devices can incorporate logic related to the delivery of a second subset of the content from a second Point of Presence based on minimizing costs associated with delivery of the second subset.

20 Claims, 11 Drawing Sheets

(51) Int. Cl.
*H04L 29/06* (2006.01)
*H04L 12/911* (2013.01)
*H04L 29/08* (2006.01)

(56) References Cited

U.S. PATENT DOCUMENTS

| | | | |
|---|---|---|---|
| 5,852,717 A | 12/1998 | Bhide et al. |
| 6,016,512 A | 1/2000 | Huitema |
| 6,052,718 A | 4/2000 | Gifford |
| 6,078,960 A | 6/2000 | Ballard |
| 6,098,096 A | 8/2000 | Tsirigotis et al. |
| 6,108,703 A | 8/2000 | Leighton et al. |
| 6,157,942 A | 12/2000 | Chu et al. |
| 6,167,438 A | 12/2000 | Yates et al. |
| 6,182,111 B1 | 1/2001 | Inohara et al. |
| 6,185,598 B1 | 2/2001 | Farber et al. |
| 6,192,051 B1 | 2/2001 | Lipman et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,363,411 B1 | 3/2002 | Dugan et al. |
| 6,374,290 B1 | 4/2002 | Scharber et al. |
| 6,405,252 B1 | 6/2002 | Gupta et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,459,909 B1 | 10/2002 | Bilcliff et al. |
| 6,484,143 B1 | 11/2002 | Swildens et al. |
| 6,529,953 B1 | 3/2003 | Van Renesse |
| 6,553,413 B1 | 4/2003 | Leighton et al. |
| 6,611,873 B1 | 8/2003 | Kanehara |
| 6,654,807 B2 | 11/2003 | Farber et al. |
| 6,658,462 B1 | 12/2003 | Dutta |
| 6,665,706 B2 | 12/2003 | Kenner et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,760,721 B1 | 7/2004 | Chasen et al. |
| 6,782,398 B1 | 8/2004 | Bahl |
| 6,785,704 B1 | 8/2004 | McCanne |
| 6,810,291 B2 | 10/2004 | Card et al. |
| 6,829,654 B1 | 12/2004 | Jungck |
| 6,874,017 B1 | 3/2005 | Inoue et al. |
| 6,928,467 B2 | 8/2005 | Peng et al. |
| 6,941,562 B2 | 9/2005 | Gao et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,092,505 B2 | 8/2006 | Allison et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,821 B1 | 11/2006 | Shah et al. |
| 7,143,169 B1 | 11/2006 | Champagne et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,194,522 B1 | 3/2007 | Swildens et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,233,978 B2 | 6/2007 | Overton et al. |
| 7,240,100 B1 | 7/2007 | Wein et al. |
| 7,257,581 B1 | 8/2007 | Steele et al. |
| 7,260,598 B1 | 8/2007 | Liskov et al. |
| 7,274,658 B2 | 9/2007 | Bornstein et al. |
| 7,289,519 B1 | 10/2007 | Liskov |
| 7,293,093 B2 | 11/2007 | Leighton |
| 7,310,686 B2 | 12/2007 | Uysal |
| 7,320,131 B1 | 1/2008 | O'Toole, Jr. |
| 7,321,918 B2 | 1/2008 | Burd et al. |
| 7,363,291 B1 | 4/2008 | Page |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,398,301 B2 | 7/2008 | Hennessey et al. |
| 7,430,610 B2 | 9/2008 | Pace et al. |
| 7,441,045 B2 | 10/2008 | Skene et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,565,407 B1 | 7/2009 | Hayball |
| 7,650,376 B1 | 1/2010 | Blumenau |
| 7,653,700 B1 | 1/2010 | Bahl et al. |
| 7,657,622 B1 | 2/2010 | Douglis et al. |
| 7,680,897 B1 | 3/2010 | Carter et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,725,602 B2 | 5/2010 | Liu et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,774,342 B1 | 8/2010 | Virdy |
| 7,792,989 B2 | 9/2010 | Toebes et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,836,177 B2 | 11/2010 | Kasriel et al. |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,937,477 B1 | 5/2011 | Day et al. |
| 7,949,779 B2 | 5/2011 | Farber et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,041,809 B2 | 10/2011 | Sundaram et al. |
| 8,065,275 B2 | 11/2011 | Eriksen et al. |
| 8,073,940 B1 | 12/2011 | Richardson et al. |
| 8,082,348 B1 | 12/2011 | Averbuj et al. |
| 8,117,306 B1 | 2/2012 | Baumback et al. |
| 8,122,098 B1 | 2/2012 | Richardson et al. |
| 8,199,752 B2 | 6/2012 | Swanson et al. |
| 8,200,958 B2 | 6/2012 | Coppola et al. |
| 8,239,530 B2 | 8/2012 | Sundaram et al. |
| 8,250,211 B2 | 8/2012 | Swildens et al. |
| 8,266,327 B2 | 9/2012 | Kumar et al. |
| 8,291,117 B1 | 10/2012 | Eggleston et al. |
| 8,452,874 B2 | 5/2013 | MacCarthaigh et al. |
| 8,468,222 B2 | 6/2013 | Sakata et al. |
| 8,521,851 B1 | 8/2013 | Richardson et al. |
| 8,521,908 B2 | 8/2013 | Holmes et al. |
| 8,527,658 B2 | 9/2013 | Holmes et al. |
| 8,577,992 B1 | 11/2013 | Richardson et al. |
| 8,615,549 B2 | 12/2013 | Knowles et al. |

(56) References Cited

U.S. PATENT DOCUMENTS

| | | |
|---|---|---|
| 8,626,950 B1 | 1/2014 | Richardson et al. |
| 8,639,817 B2 | 1/2014 | Sivasubramanian et al. |
| 8,676,918 B2 | 3/2014 | Richardson et al. |
| 8,688,837 B1 | 4/2014 | Richardson et al. |
| 8,732,309 B1 | 5/2014 | Richardson et al. |
| 8,756,272 B1 | 6/2014 | MacCarthaigh |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 2001/0000811 A1 | 5/2001 | May et al. |
| 2001/0032133 A1 | 10/2001 | Moran |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0048269 A1 | 4/2002 | Hong et al. |
| 2002/0049608 A1 | 4/2002 | Hartsell et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0083148 A1 | 6/2002 | Shaw et al. |
| 2002/0092026 A1 | 7/2002 | Janniello et al. |
| 2002/0107944 A1 | 8/2002 | Bai et al. |
| 2002/0124098 A1 | 9/2002 | Shaw |
| 2002/0129123 A1 | 9/2002 | Johnson et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0147774 A1 | 10/2002 | Lisiecki et al. |
| 2002/0156911 A1 | 10/2002 | Croman et al. |
| 2002/0161767 A1 | 10/2002 | Shapiro et al. |
| 2002/0188722 A1 | 12/2002 | Banerjee et al. |
| 2002/0198953 A1 | 12/2002 | O'Rourke et al. |
| 2003/0028642 A1 | 2/2003 | Agarwal et al. |
| 2003/0033283 A1 | 2/2003 | Evans et al. |
| 2003/0099202 A1 | 5/2003 | Lear et al. |
| 2003/0101278 A1 | 5/2003 | Garcia-Luna-Aceves et al. |
| 2003/0120741 A1 | 6/2003 | Wu et al. |
| 2003/0135509 A1 | 7/2003 | Davis et al. |
| 2003/0145066 A1 | 7/2003 | Okada et al. |
| 2003/0149581 A1 | 8/2003 | Chaudhri et al. |
| 2003/0172145 A1 | 9/2003 | Nguyen |
| 2003/0174648 A1 | 9/2003 | Wang et al. |
| 2003/0187935 A1 | 10/2003 | Agarwalla et al. |
| 2003/0200394 A1 | 10/2003 | Ashmore et al. |
| 2003/0233423 A1 | 12/2003 | Dilley et al. |
| 2003/0233455 A1 | 12/2003 | Leber et al. |
| 2003/0236700 A1 | 12/2003 | Arning et al. |
| 2004/0019518 A1 | 1/2004 | Abraham et al. |
| 2004/0024841 A1 | 2/2004 | Becker et al. |
| 2004/0034744 A1 | 2/2004 | Karlsson et al. |
| 2004/0039798 A1 | 2/2004 | Hotz et al. |
| 2004/0059805 A1 | 3/2004 | Dinker et al. |
| 2004/0064501 A1 | 4/2004 | Jan et al. |
| 2004/0073867 A1 | 4/2004 | Kausik et al. |
| 2004/0078468 A1 | 4/2004 | Hedin et al. |
| 2004/0083283 A1 | 4/2004 | Sundaram et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0194085 A1 | 9/2004 | Beaubien et al. |
| 2004/0203630 A1 | 10/2004 | Wang |
| 2004/0205149 A1 | 10/2004 | Dillon et al. |
| 2004/0249939 A1 | 12/2004 | Amini et al. |
| 2004/0249971 A1 | 12/2004 | Klinker |
| 2004/0254921 A1 | 12/2004 | Cohen et al. |
| 2004/0267906 A1 | 12/2004 | Truty |
| 2005/0010653 A1 | 1/2005 | McCanne |
| 2005/0044270 A1 | 2/2005 | Grove et al. |
| 2005/0114296 A1 | 5/2005 | Farber et al. |
| 2005/0132083 A1 | 6/2005 | Raciborski et al. |
| 2005/0163168 A1 | 7/2005 | Sheth et al. |
| 2005/0168782 A1 | 8/2005 | Kobashi et al. |
| 2005/0216674 A1 | 9/2005 | Robbin et al. |
| 2005/0232165 A1 | 10/2005 | Brawn et al. |
| 2005/0259672 A1 | 11/2005 | Eduri |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0020596 A1 | 1/2006 | Liu et al. |
| 2006/0020684 A1 | 1/2006 | Mukherjee et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0037037 A1 | 2/2006 | Miranz |
| 2006/0041614 A1 | 2/2006 | Oe |
| 2006/0047813 A1 | 3/2006 | Aggarwal et al. |
| 2006/0064476 A1 | 3/2006 | Decasper et al. |
| 2006/0064500 A1 | 3/2006 | Roth et al. |
| 2006/0074750 A1 | 4/2006 | Clark et al. |
| 2006/0075139 A1 | 4/2006 | Jungck |
| 2006/0112066 A1 | 5/2006 | Hamzy |
| 2006/0112176 A1 | 5/2006 | Liu et al. |
| 2006/0129665 A1 | 6/2006 | Toebes et al. |
| 2006/0143293 A1 | 6/2006 | Freedman |
| 2006/0149529 A1 | 7/2006 | Nguyen et al. |
| 2006/0155823 A1 | 7/2006 | Tran et al. |
| 2006/0161541 A1 | 7/2006 | Cencini |
| 2006/0168088 A1 | 7/2006 | Leighton et al. |
| 2006/0184936 A1 | 8/2006 | Abels et al. |
| 2006/0195866 A1 | 8/2006 | Thukral |
| 2006/0218304 A1 | 9/2006 | Mukherjee et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0253546 A1 | 11/2006 | Chang et al. |
| 2006/0259690 A1 | 11/2006 | Vittal et al. |
| 2006/0271641 A1 | 11/2006 | Stavrakos et al. |
| 2006/0282522 A1 | 12/2006 | Lewin et al. |
| 2007/0005892 A1 | 1/2007 | Mullender et al. |
| 2007/0038994 A1 | 2/2007 | Davis et al. |
| 2007/0043859 A1 | 2/2007 | Ruul |
| 2007/0050522 A1 | 3/2007 | Grove et al. |
| 2007/0061440 A1 | 3/2007 | Sundaram et al. |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0174426 A1 | 7/2007 | Swildens et al. |
| 2007/0174490 A1 | 7/2007 | Choi et al. |
| 2007/0183342 A1 | 8/2007 | Wong et al. |
| 2007/0204107 A1 | 8/2007 | Greenfield et al. |
| 2007/0208737 A1 | 9/2007 | Li et al. |
| 2007/0244964 A1 | 10/2007 | Challenger et al. |
| 2007/0250467 A1 | 10/2007 | Mesnik et al. |
| 2007/0250601 A1 | 10/2007 | Amlekar et al. |
| 2007/0253377 A1 | 11/2007 | Janneteau et al. |
| 2007/0255843 A1 | 11/2007 | Zubev |
| 2007/0263604 A1 | 11/2007 | Tai |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0288588 A1 | 12/2007 | Wein et al. |
| 2008/0005057 A1 | 1/2008 | Ozzie et al. |
| 2008/0008089 A1 | 1/2008 | Bornstein et al. |
| 2008/0046596 A1 | 2/2008 | Afergan et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0086574 A1 | 4/2008 | Raciborski et al. |
| 2008/0103805 A1 | 5/2008 | Shear et al. |
| 2008/0114829 A1 | 5/2008 | Button et al. |
| 2008/0134043 A1 | 6/2008 | Georgis et al. |
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162821 A1 | 7/2008 | Duran et al. |
| 2008/0172488 A1 | 7/2008 | Jawahar et al. |
| 2008/0189437 A1 | 8/2008 | Halley |

(56) References Cited

U.S. PATENT DOCUMENTS

| | | |
|---|---|---|
| 2008/0201332 A1 | 8/2008 | Souders et al. |
| 2008/0215730 A1 | 9/2008 | Sundaram et al. |
| 2008/0215755 A1 | 9/2008 | Farber et al. |
| 2008/0222295 A1 | 9/2008 | Robinson et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2009/0013063 A1 | 1/2009 | Soman |
| 2009/0049098 A1 | 2/2009 | Pickelsimer et al. |
| 2009/0063704 A1 | 3/2009 | Taylor et al. |
| 2009/0070533 A1 | 3/2009 | Elazary et al. |
| 2009/0106381 A1 | 4/2009 | Kasriel et al. |
| 2009/0112703 A1 | 4/2009 | Brown |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0248852 A1 | 10/2009 | Fuhrmann et al. |
| 2009/0248893 A1 | 10/2009 | Richardson et al. |
| 2009/0249222 A1 | 10/2009 | Schmidt et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2010/0005175 A1 | 1/2010 | Swildens et al. |
| 2010/0011061 A1 | 1/2010 | Hudson et al. |
| 2010/0023601 A1 | 1/2010 | Lewin et al. |
| 2010/0057894 A1 | 3/2010 | Glasser |
| 2010/0070603 A1 | 3/2010 | Moss et al. |
| 2010/0088367 A1 | 4/2010 | Brown et al. |
| 2010/0088405 A1 | 4/2010 | Huang et al. |
| 2010/0111059 A1 | 5/2010 | Bappu et al. |
| 2010/0122069 A1 | 5/2010 | Gonion |
| 2010/0125675 A1 | 5/2010 | Richardson et al. |
| 2010/0131646 A1 | 5/2010 | Drako |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0192225 A1 | 7/2010 | Ma et al. |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0293479 A1 | 11/2010 | Rousso et al. |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0332595 A1 | 12/2010 | Fullagar et al. |
| 2011/0029598 A1 | 2/2011 | Arnold et al. |
| 2011/0040893 A1 | 2/2011 | Karaoguz et al. |
| 2011/0078230 A1 | 3/2011 | Sepulveda |
| 2011/0087769 A1 | 4/2011 | Holmes et al. |
| 2011/0153941 A1 | 6/2011 | Spatscheck et al. |
| 2011/0191449 A1 | 8/2011 | Swildens et al. |
| 2011/0238501 A1 | 9/2011 | Almeida |
| 2011/0238793 A1 | 9/2011 | Bedare et al. |
| 2011/0252142 A1 | 10/2011 | Richardson et al. |
| 2011/0258049 A1 | 10/2011 | Ramer et al. |
| 2011/0276623 A1 | 11/2011 | Girbal |
| 2012/0036238 A1 | 2/2012 | Sundaram et al. |
| 2012/0066360 A1 | 3/2012 | Ghosh |
| 2012/0124184 A1 | 5/2012 | Sakata et al. |
| 2012/0131177 A1 | 5/2012 | Brandt et al. |
| 2012/0166516 A1 | 6/2012 | Simmons et al. |
| 2012/0169646 A1 | 7/2012 | Berkes et al. |
| 2012/0179839 A1 | 7/2012 | Raciborski et al. |
| 2012/0198043 A1 | 8/2012 | Hesketh et al. |
| 2012/0233522 A1 | 9/2012 | Barton et al. |
| 2012/0233668 A1 | 9/2012 | Leafe et al. |
| 2012/0303804 A1 | 11/2012 | Sundaram et al. |
| 2012/0311648 A1 | 12/2012 | Swildens et al. |
| 2013/0041872 A1 | 2/2013 | Aizman et al. |
| 2013/0086001 A1 | 4/2013 | Bhogal et al. |
| 2013/0130221 A1 | 5/2013 | Kortemeyer et al. |
| 2013/0198341 A1 | 8/2013 | Kim |
| 2013/0212300 A1 | 8/2013 | Eggleston et al. |
| 2013/0246567 A1 | 9/2013 | Green et al. |
| 2013/0268616 A1 | 10/2013 | Sakata et al. |
| 2013/0339429 A1 | 12/2013 | Richardson et al. |
| 2014/0075109 A1 | 3/2014 | Richardson et al. |
| 2014/0143320 A1 | 5/2014 | Sivasubramanian et al. |

FOREIGN PATENT DOCUMENTS

| | | |
|---|---|---|
| JP | 2001-0506093 | 5/2001 |
| JP | 2002-044137 | 2/2002 |
| JP | 2003-167810 A | 6/2003 |
| JP | 2003-167813 A | 6/2003 |
| JP | 2003-522358 A | 7/2003 |
| JP | 2004-533738 A | 11/2004 |
| JP | 2005-537687 | 12/2005 |
| JP | 2009-071538 A | 4/2009 |
| JP | 2012-209623 | 10/2012 |
| WO | WO 2007/007960 A1 | 1/2007 |
| WO | WO 2010/002603 A1 | 1/2010 |

OTHER PUBLICATIONS

"Grid Computing Solutions," Sun Microsystems, Inc., retrieved May 3, 2006, from http://www.sun.com/software/grid, 3 pages.

"Grid Offerings," Java.net, retrieved May 3, 2006, from http://wiki.java.net/bin/view/Sungrid/OtherGridOfferings, 8 pages.

"Recent Advances Boost System Virtualization," eWeek.com, retrieved from May 3, 2006, http://www.eWeek.com/article2/0,1895,1772626,00.asp, 5 pages.

"Scaleable Trust of Next Generation Management (STRONGMAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Softricity Desktop," Softricity, Inc., retrieved May 3, 2006, from http://www.softricity.com/products/, 3 pages.

"Xen—The Xen virtual Machine Monitor," University of Cambridge Computer Laboratory, retrieved Nov. 8, 2005, from http://www.cl.cam.ac.uk/Research/SRG/netos/xen/, 2 pages.

"XenFaq," retrieved Nov. 8, 2005, from http://wiki.xensource.com/xenwiki/XenFaq?action=print, 9 pages.

Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.

American Bar Association; Digital Signature Guidelines Tutorial [online]; Feb. 10, 2002 [retrieved on Mar. 2, 2010]; American Bar

(56) References Cited

OTHER PUBLICATIONS

Association Section of Science and Technology Information Security Committee; Retrieved from the internet: (URL: http://web.archive.org/web/20020210124615/www.abanet.org/scitech/ec/isc/dsg-tutorial.html; pp. 1-8.
Baglioni et al., "Preprocessing and Mining Web Log Data for Web Personalization", LNAI 2829, 2003, pp. 237-249.
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Byun et al., "A Dynamic Grid Services Deployment Mechanism for On-Demand Resource Provisioning", IEEE International Symposium on Cluster Computing and the Grid:863-870, 2005.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/ixf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes", Dec. 18, 2004, Technical University Berlin, all pages.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kenshi, P., "Help File Library: Iptables Basics," Justlinux, retrieved Dec. 1, 2005, from http://www.justlinux.com/nhf/Security/Iptables_Basics.html, 4 pages.
Liu et al., "Combined mining of Web server logs and web contents for classifying user navigation patterns and predicting users' future requests," Data & Knowledge Engineering 61 (2007) pp. 304-330.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Xu et al., "Decision tree regression for soft classification of remote sensing data", Remote Sensing of Environment 97 (2005) pp. 322-336.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, mailed Oct. 12, 2011 in 11 pages.
Supplementary European Search Report in Application No. 09727694.3 mailed Jan. 30, 2012 in 6 pages.
Singapore Examination Report in Application No. 201006837-7 mailed Mar. 16, 2012.
First Office Action in Chinese Application No. 200980111426.1 mailed Feb. 16, 2013.
Second Office Action in Chinese Application No. 200980111426.1 mailed Dec. 25, 2013.
Third Office Action in Chinese Application No. 200980111426.1 mailed Jul. 7, 2014.
First Office Action in Japanese Application No. 2011-502139 dated Nov. 5, 2013.
Decision of Rejection in Application No. 2011-502139 dated Jun. 30, 2014.
Singapore Written Opinion in Application No. 201006874-0, mailed Oct. 12, 2011 in 10 pages.
First Office Action in Japanese Application No. 2011-502140 mailed Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Supplementary European Search Report in Application No. 09728756.9 mailed Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Search Report and Written Opinion issued in Singapore Application No. 201006873-2 mailed on Oct. 12, 2011.
First Office Action in Japanese Application No. 2011-516466 mailed Mar. 6, 2013.
Second Office Action in Japanese Application No. 2011-516466 mailed Mar. 17, 2014.
Office Action in Canadian Application No. 2726915 dated May 13, 2013.
Office Action in Korean Application No. 10-2011-7002461 mailed May 29, 2013.
First Office Action in Chinese Application No. 200980145872.4 dated Nov. 29, 2012.
Preliminary Examination in Chinese Application No. 201310717573.1 dated Feb. 25, 2014.

(56) References Cited

OTHER PUBLICATIONS

Office Action in Canadian Application No. 2741895 dated Feb. 25, 2013.
Office Action in Canadian Application No. 2741895 dated Oct. 21, 2013.
Search Report and Written Opinion in Singapore Application No. 201103333-9 mailed Nov. 19, 2012.
Examination Report in Singapore Application No. 201103333-9 dated Aug. 13, 2013.
International Search Report and Written Opinion in PCT/US2011/053302 mailed Nov. 28, 2011 in 11 pages.
International Preliminary Report on Patentability in PCT/US2011/053302 mailed Apr. 2, 2013.
First Office Action in Japanese Application No. 2013-529454 mailed Feb. 3, 2014 in 6 pages.
First Office Action issued in Australian Application No. 2011307319 mailed Mar. 6, 2014 in 5 pages.
Search Report and Written Opinion in Singapore Application No. 201301573-0 mailed Jul. 1, 2014.
International Preliminary Report on Patentability in PCT/US2011/061486 mailed May 22, 2013.
International Search Report and Written Opinion in PCT/US2011/061486 mailed Mar. 30, 2012 in 11 pages.
Preliminary Examination in Chinese Application No. 201180053405.6 dated May 28, 2013.
Office Action in Japanese Application No. 2013-540982 dated Jun. 2, 2014.
Written Opinion in Singapore Application No. 201303521-7 dated May 20, 2014.
International Search Report and Written Opinion in PCT/US07/07601 mailed Jul. 18, 2008 in 11 pages.
International Preliminary Report on Patentability in PCT/US2007/007601 mailed Sep. 30, 2008 in 8 pages.
Supplementary European Search Report in Application No. 07754164.7 mailed Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 mailed Dec. 11, 2012 in 26 pages.
Office Action in Japanese Application No. 2013-123086 mailed Apr. 15, 2014 in 3 pages.

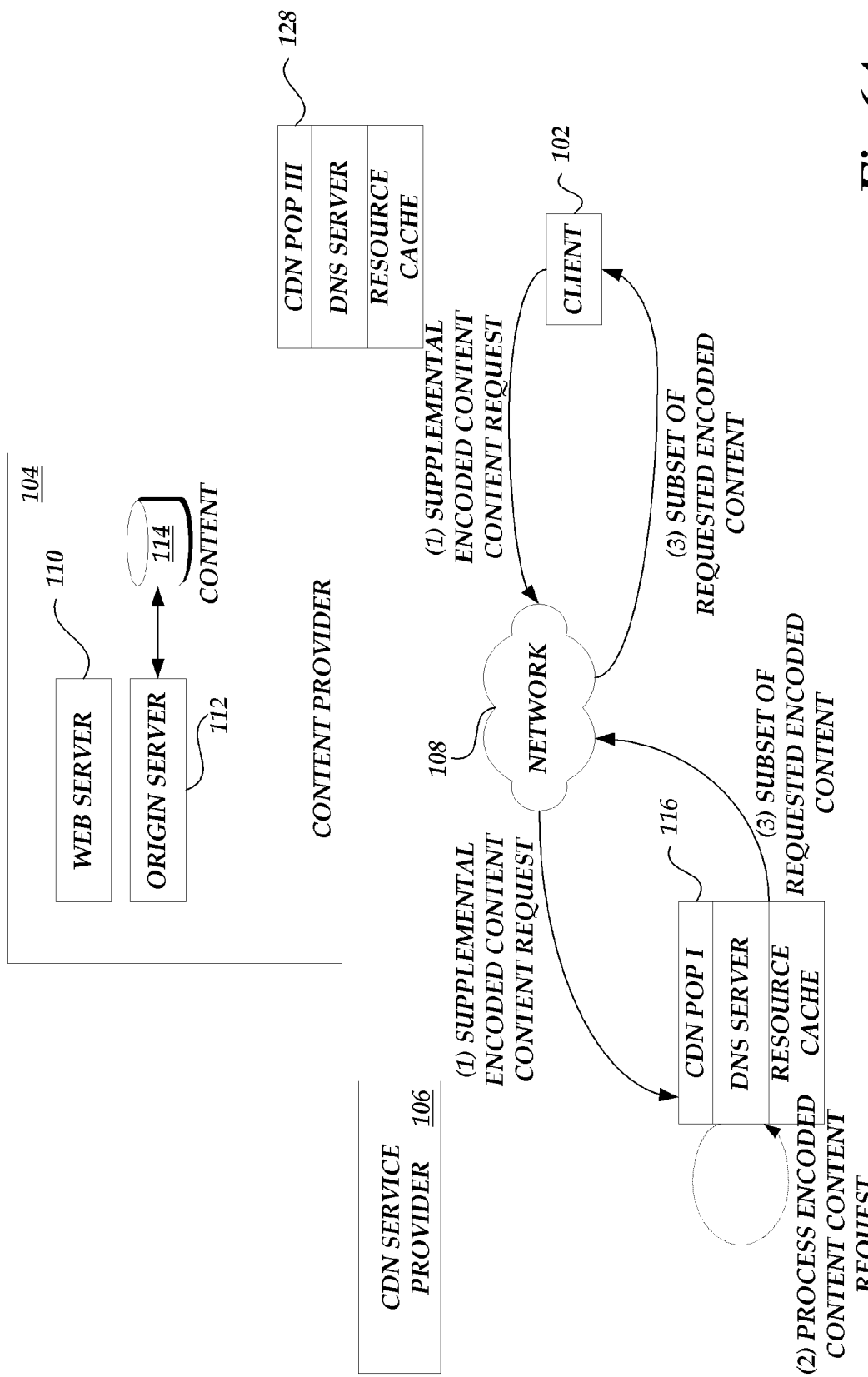

PROCESSING ENCODED CONTENT

RELATED APPLICATIONS

Incorporation by Reference to any Priority Applications

Any and all applications for which a foreign or domestic priority claim is identified in the Application Data Sheet as filed with the present application are incorporated by reference under 37 CFR 1.57 and made a part of this specification.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device or consideration of a cost associated with the transmission of the content. For larger scale implementations, a content provider may receive content requests from a high volume of client computing devices or for larger sized pieces of content (e.g., high resolution video content) which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device or consideration of a cost associated with the transmission of the content. Additionally, CDN service providers often consider factors such as latency of delivery of requested content in order to meet service level agreements with contracted content providers or generally improve the quality of delivery service. The consideration of such factors can be applied with regard to decisions by a CDN service provider as to which of the several available computing devices is best suited to process client computing device requests for content. In some embodiments, selection of a computing device for purposes of minimizing latencies or improving the quality of the delivery service corresponds to a higher cost incurred by the CDN service provider, content provider, or both.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 6A and 6B are block diagrams of the content delivery environment of FIG. 1 illustrating the generation and processing of supplemental streaming media content requests from a client computing device to a CDN service provider;

DETAILED DESCRIPTION

Generally described, aspects of the present disclosure are directed to providing content. Specifically, aspects of the disclosure will be described with regard to the management of client computing device content requests by service providers, such as content delivery network ("CDN") service providers. Illustratively, the requested content corresponds to content which can be encoded as a series of ordered subparts, such as frames. Additionally, the content can include a number of reference subparts through the series of ordered subparts. Accordingly, the management of the content requests can include the selection of computing devices corresponding to various Point of Presence locations for providing requested content. The selection of the computing devices can incorporate logic related to the delivery of a first subset of the content from a Point of Presence based on minimizing delivery latencies. The selection of the computing devices can incorporate logic related to the delivery of a second subset of the content from a second Point of Presence based on minimizing costs associated with delivery of the second subset. Although various aspects of the disclosure will be described with regard to illustrative examples and embodiments, one skilled in the art will appreciate that the disclosed embodiments and examples should not be construed as limiting.

Figure 1:
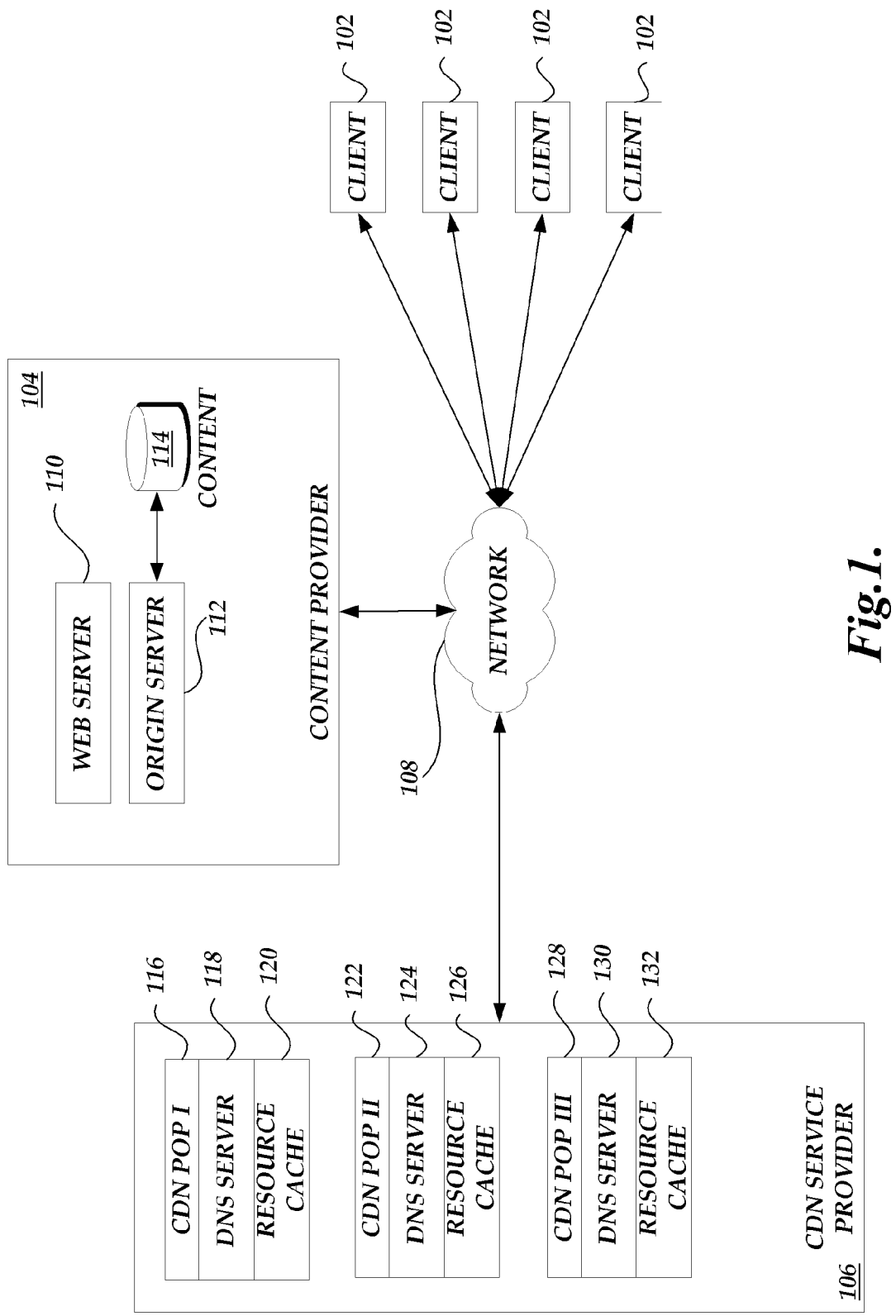
FIG. 1 is a block diagram illustrative of content delivery environment including a number of client computing devices, a content provider, and a content delivery network service provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. As will be explained in greater detail below, the requested content will correspond, at least in part, content that has been encoded into one or more subparts, such as for purposes of data compression. The encoded content can be rendered or processed by the client computing in an ordered manner. An example of such ordered content includes streaming media content. In an illustrative embodiment, the client computing devices 102 can corresponds to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 can utilize some type of local DNS resolver component, such as a DNS Name server, that generates the DNS queries attributed to the client computing device 102. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102. However, for purposes of the present disclosure, communications facilitated through a network component, such as a DNS Resolver component, will be illustrated as transmitted directly from the client computing devices 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence (herein "POP") locations 116, 122, 128 that correspond to nodes on the communication network 108. Each POP 116, 122, 128 includes a DNS component 118, 124, 130 made up of a number of DNS server computing devices for resolving DNS queries from the client computers 102. Each POP 116, 122, 128 also includes a resource cache component 120, 126, 132 made up of a number of cache server computing devices for storing resources from content providers and transmitting various requested resources to various client computers. The DNS components 118, 124 and 130 and the resource cache components 120, 126 132 may further include additional software and/or hardware components that facilitate communications including, but not limited, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN Provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
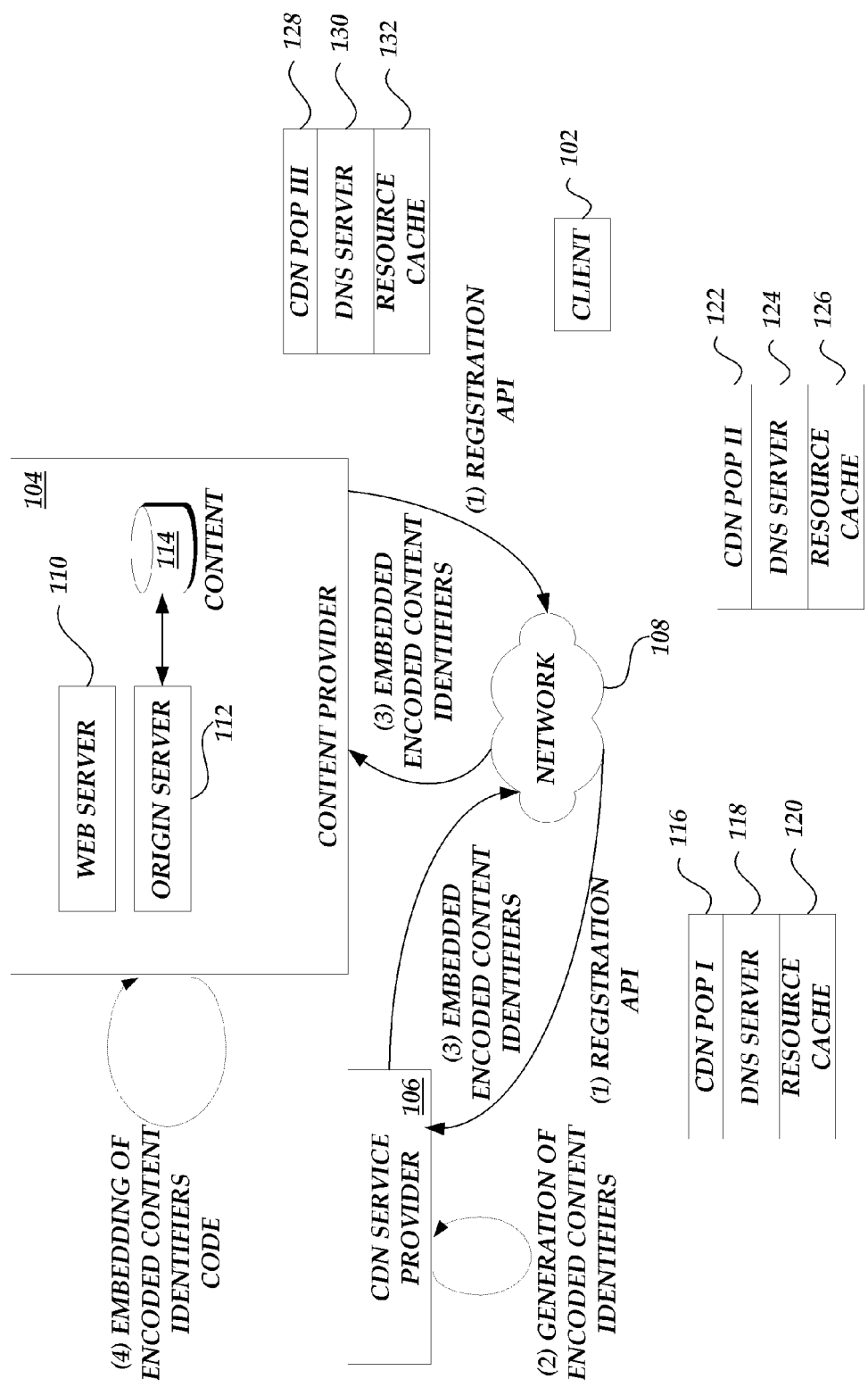
FIG. 2 is a block diagram of the content delivery environment of FIG. 1 illustrating the registration of a content provider with a content delivery service provider.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a POP 116, 122, 128 associated with the CDN service provider 106. In the event that the resource cache component 120, 126, 132 of a selected POP does not have a copy of a resource requested by a client computing device 102, the resource cache component will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, executable code for processing resource identifiers, such as script-based instructions, the like. One skilled in the relevant art will appreciate that various types of additional information may be generated by the CDN service provider 106 and that the additional information may be embodied in any one of a variety of formats.

Illustratively, the CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers, such as Uniform Resource Locators ("URLs") originally directed toward a domain of the origin server 112 to a domain corresponding to the CDN service provider. The translated URLs are embedded into requested content in a manner such that DNS queries for the translated URLs will resolve to a DNS sever corresponding to the CDN service provider 106 and not a DNS server corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a URL. Because the resource identifiers are included in the requested content directed to the content provided, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

contentprovider.com/path/resource.xxx

During an illustrative translation process, the content provider URL is modified such that requests for the resources associated with the translated URLs resolve to a POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). Additionally, the translated URL can include additional processing information (e.g., "additional information"). The translated URL would have the form of:

additional_information.cdnprovider.com/path/resources_xxx

Figure 3:
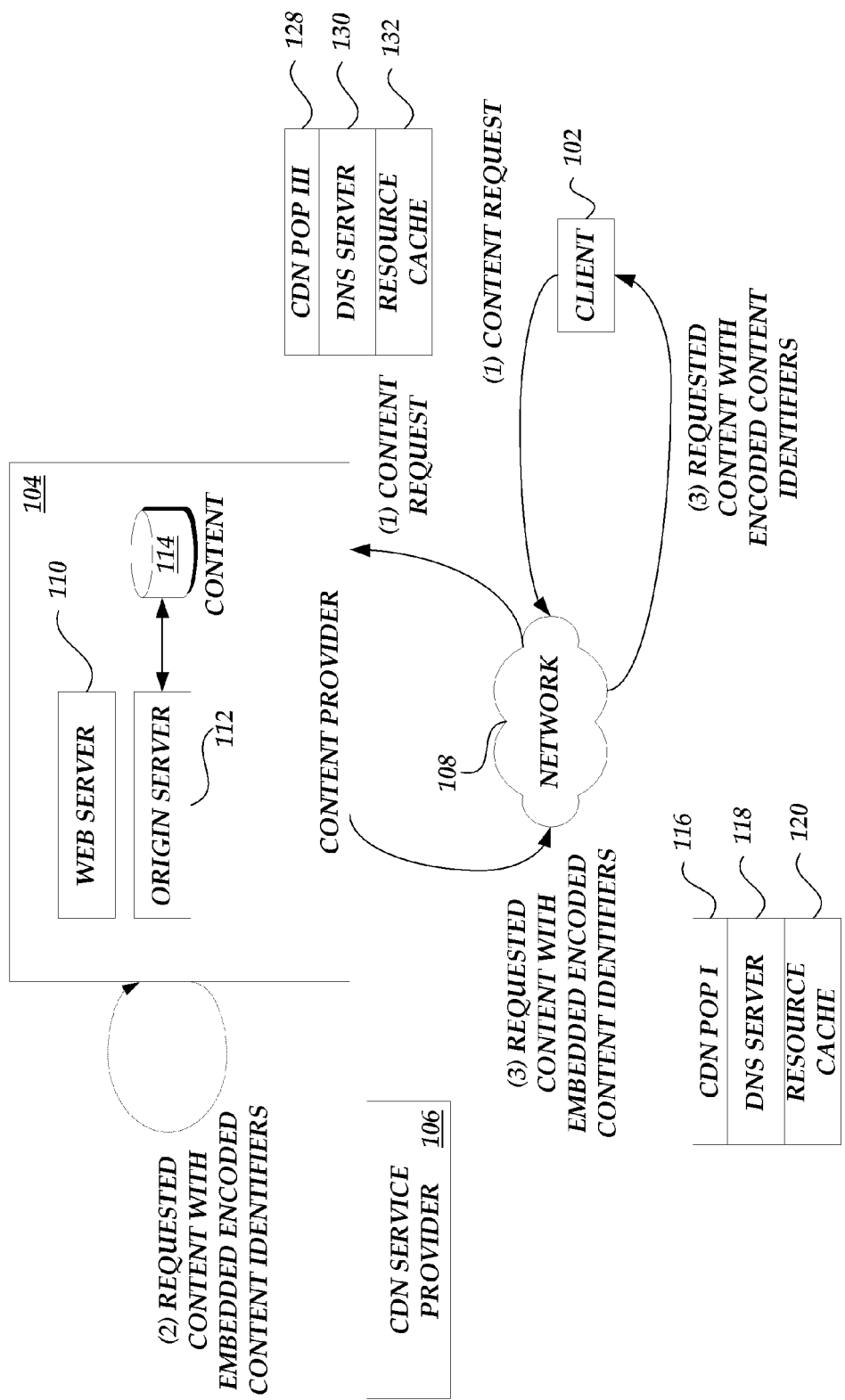
FIG. 3 is a block diagram of the content delivery environment of FIG. 1 illustrating the generation and processing of a content request from a client computing device to a content provider.

In another embodiment, the information associated with the CDN service provider 106 is included the modified URL, such as through prepending or other techniques, such that the translated URL can maintain all of the information associated with the original URL. In this embodiment, the translated URL would have the form of:

additional_information.cdnprovider.com/www.contentprovider.com/path/resource.xxx With reference now to FIG. 3, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers can be generally referred to as original resource identifiers or original URLs. However, ones skilled in the relevant art will appreciate that the client computing device 102 may initiate content requests in accordance with alternative embodiments and in conjunction with alternative network protocols.

In one embodiment, upon receipt of the requested content, the client computing device 102, such as through a browser software application, begins processing any of the markup code included in the content and attempts to acquire the resources identified by the embedded resource identifiers. In another embodiment, the client computing device 102 may attempt to acquire resources identified by embedded resource identifiers on an event driven basis, such as responsive to user initiated actions, satisfaction of time based criteria or other defined events. Although not illustrated in FIG. 3, the client computing device 102 would first issue a DNS query for the embedded resource previously provided by the CDN service provider 102, which if properly resolved, would include the identification of the above mentioned IP address associated with the CDN service provider 106. For example, the first step in acquiring the content correspond to the issuance, by the client computing device 102 (through its local DNS resolver), a DNS query for the Original URL resource identifier that results in the identification of a DNS server authoritative to the "." and the "com" portions of the translated URL.

After resolving the "." and "com" portions of the embedded URL, the client computing device 102 then issues a DNS query for the resource URL that results in the identification of a DNS server authoritative to the ".cdnserviceprovider" portion of the embedded URL. One skilled in the relevant art will appreciate that the resolution of the DNS query may involve multiple DNS queries to either the content provider 104 or CDN service provider 106. Specifically, the successful resolution of the "cdnserviceprovider" portion of the original URL identifies a network address, such as an IP address, of a DNS server associated with the CDN service provider 106. In this embodiment, the IP address can be shared by one or more POPs. Accordingly, the further DNS query to the shared IP address utilizes a one-to-many network routing schema, such as anycast, such a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP. As will be explained in greater detail, the resolution of the Original URL will identify the IP address of a POP that has been determined to be best suited to process content requests from the client computing device 102.

Figure 4:
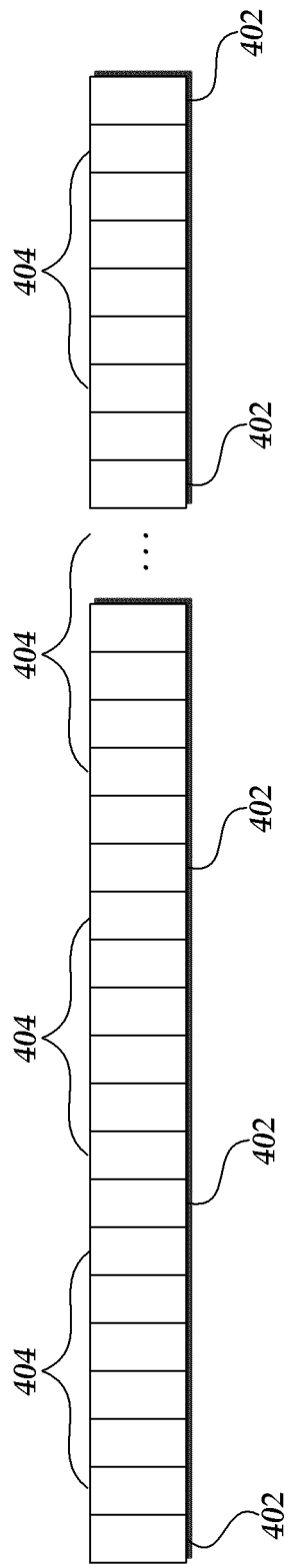
FIG. 4 is a block diagram illustrative of a structure of content having ordered frames and including one or more reference frames.

With reference now to FIG. 4, an illustrative structure of encoded content 400 encoded into one or more ordered subparts will be described. For purposes of an illustrative example, the content 400 can corresponds to multi-media content that has been encoded into a number of ordered frames, such as for purposes of data compression encoding, As illustrated in FIG. 4, the content 400 includes a number of frames 402 that correspond to reference frames for the encoded content 400. The reference frames 402 can be utilized during the rendering of the content 400 by a client computing device 102, such as for playback of a video content. Specifically, the reference frames 402 can function as the intermediary points utilized by a media player software application for playback controls, such as seeking. Additionally, the reference frames 402 can also be utilized for purposes of providing a user a preview of the different portions of the content, such as thumbnail previews. In some embodiment, the reference frames correspond to uncompressed, or otherwise unprocessed, portions of the encoded content. For example, in accordance with video compression, the reference frames are typically referred to as "i-frames." The encoded content 400 can also include a number of additional frames 404 that typically follow a reference frame 402. Illustratively, the frames of the encoded content 400 are sequentially ordered such the playback of the entire content would begin with a first frame of the encoded content and end with the last sequential frame of the encoded content.

As will be explained in greater detail below, in an illustrative embodiment, the transmittal of the encoded content 400 to a client computing device 102 from a CDN service provider 106 can include the transmittal of frames from different POPs. In one aspect, a first POP associated with the CDN service provider 106 can transmit at least a portion of reference frames and potentially some additional frames in a manner to facilitate the playback of the encoded content. Specifically, the first POP can be selected in a manner to minimize the effect of network latencies associated with the transmittal of the encoded content. In another aspect, a second POP associated with the CDN service provider 106 can transmit at least a portion of the additional frames. The second POP can be selected in a manner to minimize a cost associated with the transmittal of the additional frames. In still a further aspect, the second POP can prioritize and transmit the additional frames to provide the client computing device 102 the additional estimated to be the most likely frames to required by the client computing device 102 during rendering of the encoded content.

Figure 5A:
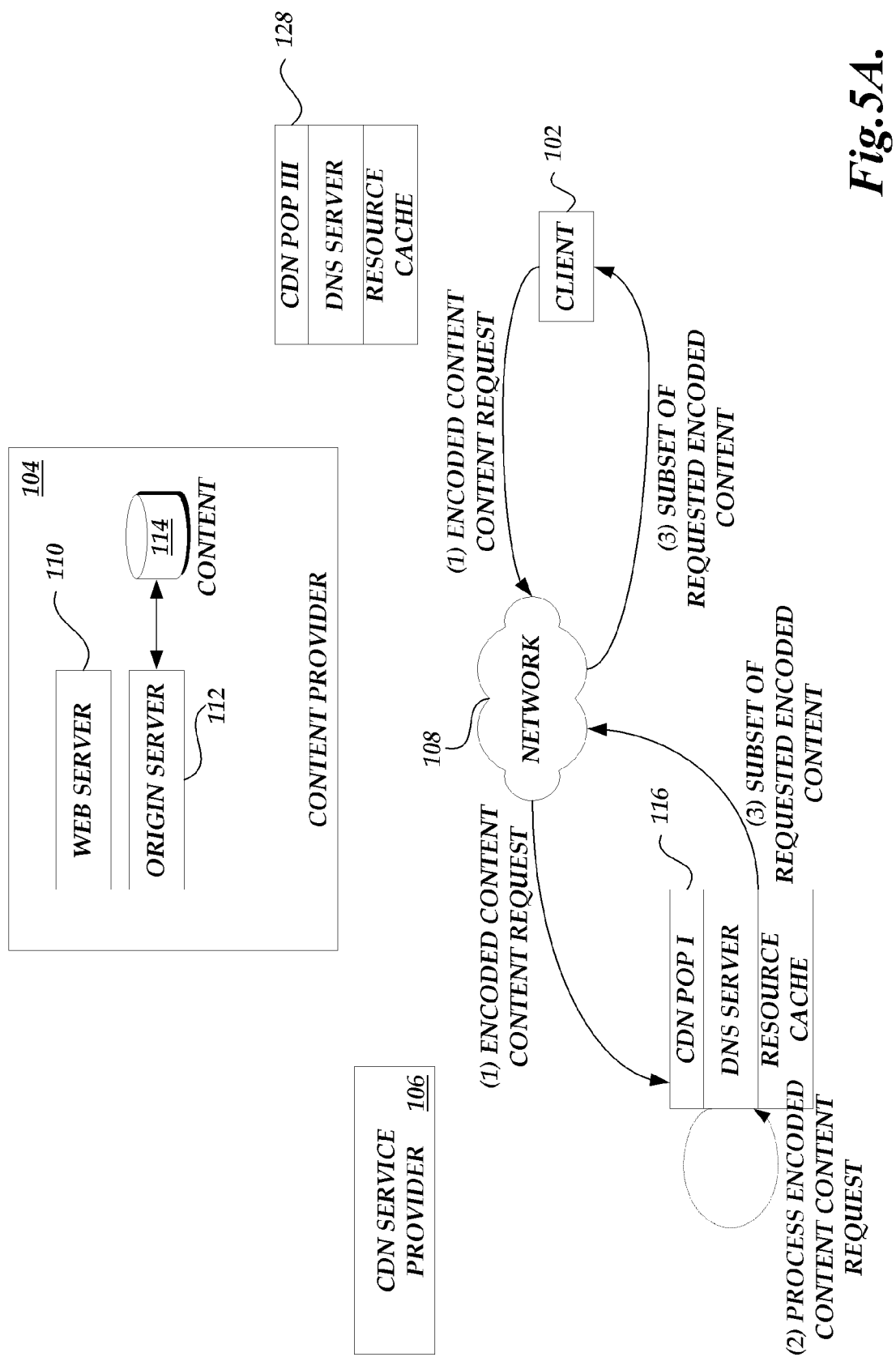
FIGS. 5A and 5B are block diagrams of the content delivery environment of FIG. 1 illustrating the generation and processing of streaming media content requests from a client computing device to a CDN service provider.

With reference now to FIG. 5A, once the client computing device 102 obtains the relevant IP address of a POP, the client computing device transmits a streaming media content request to the identified POP, illustratively, POP 116. Upon receipt of the request, the POP 116 processes the request and identifies at least a subset of the request encoded content that is to be provided to the client computing device 102. As described above, in one embodiment, the subset of the encoded content identified by the receiving POP 116 can include at least a portion of the reference frames of the encoded content. In another embodiment, the subset of the encoded content identified by the receiving POP 116 can include all of the reference frames of the encoded content. In a further embodiment, in one embodiment, the subset of the encoded content identified by the receiving POP 116 can include at least a portion of the reference frames of the encoded content and at least a portion of the additional frames of the encoded content. Illustratively, the subset of the encoded content is selected in a manner to minimize latencies associated with the delivery of the content to the client computing device 102. The identified subset is then transmitted to the client computing device 102. Additionally, in an illustrative embodiment, the receiving POP 116 can also transmit the identification of an alternative POP, or alternative POPs, that will transmit any remaining portions of the encoded content not transmitted by the receiving POP, generally referred to as the supplemental frames.

Figure 5B:
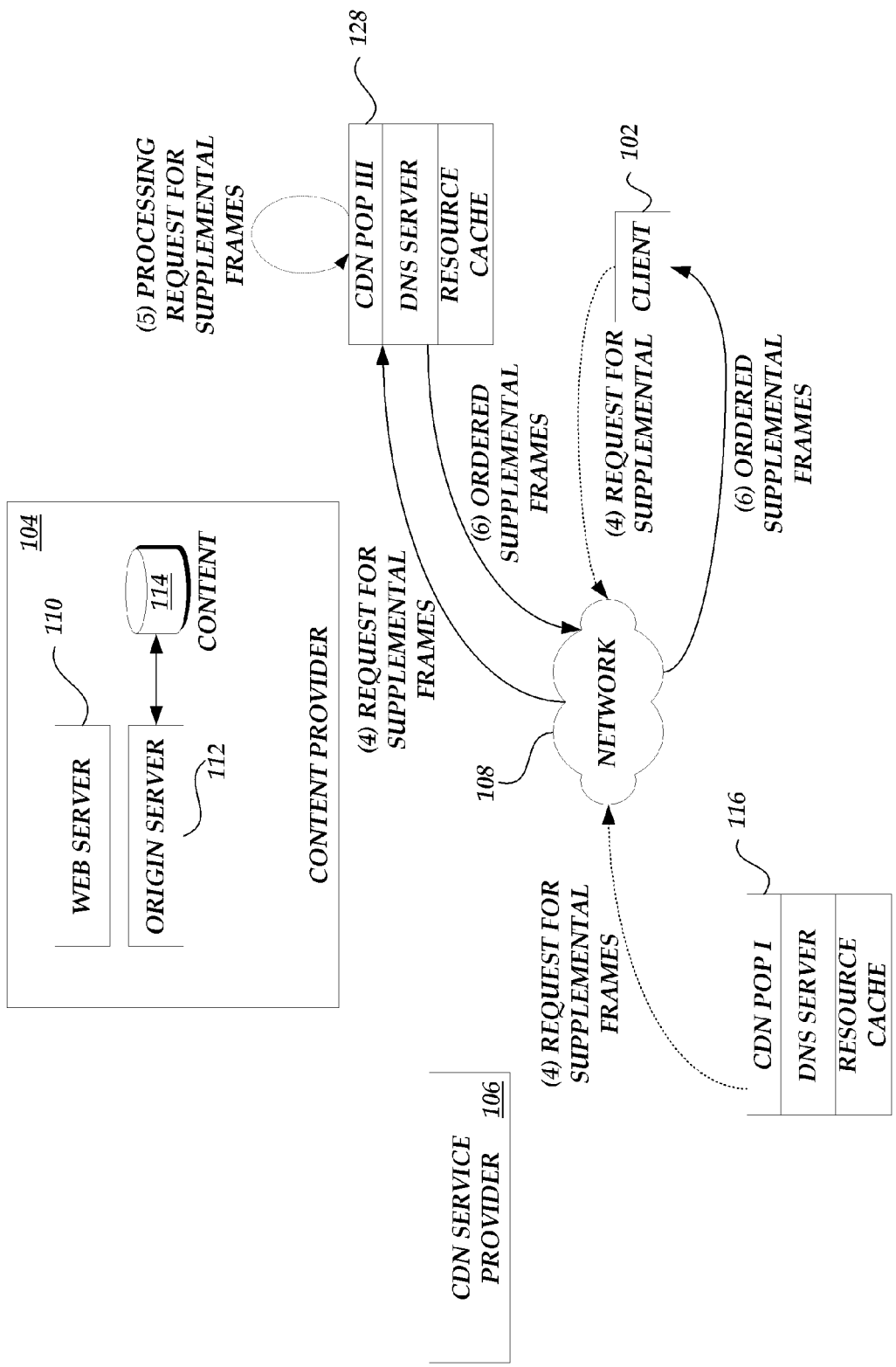

Turning to FIG. 5B, in one embodiment, the receiving POP 116 can transmit a request to the identified alternative POP, illustratively POP 128, or alternative POPs, requesting the transmittal of the supplemental frames to the client computing device 102. Alternatively, the client computing device 102 can initiate the request to the alternative POP 128. Upon receipt of the request (either from POP 116 or client computing device 102), the alternative POP 128 processes the request and identifies a subset of the encoded content that corresponds to the requested supplemental frames (or a portion of the supplemental frames if more than one alternative POP is utilized). Additionally, in an illustrative embodiment, the alternative POP 128 can then prioritize the order of the transmittal of the supplemental such that the supplemental frames most likely to be requested/required by the client computing device 102 will be transmitted first. The prioritization of the subset of encoded frames can be based on historical information related to previous access to the same content by the user or groups of users, previous access to the other content by the user or groups of users, statistical or probabilistic techniques, and the like. The alternative POP 128 transmits the supplemental frames in accordance with the priority.

With reference now to FIG. 6A, in one embodiment in which less than all the encoded content has been transmitted to the client computing device 102, a request for supplemental (or additional) content may be obtained by the client computing device, such as from a user manipulating playback controls on a software application. If the requested content is not maintained by the client computing device 102, the client computing device transmits a supplemental streaming media content request to the originally identified POP 116. Similar to the process described with regard to FIG. 5A, upon receipt of the request, the POP 116 processes the request and identifies at least a subset of the request encoded content that is to be provided to the client computing device 102. The identified subset is then transmitted to the client computing device 102. Additionally, in an illustrative embodiment, the receiving POP 116 can also transmit the identification of an alternative POP, or alternative POPs, that will transmit any remaining portions of the encoded content not transmitted by the receiving POP, generally referred to as the supplemental frames.

Figure 6B:
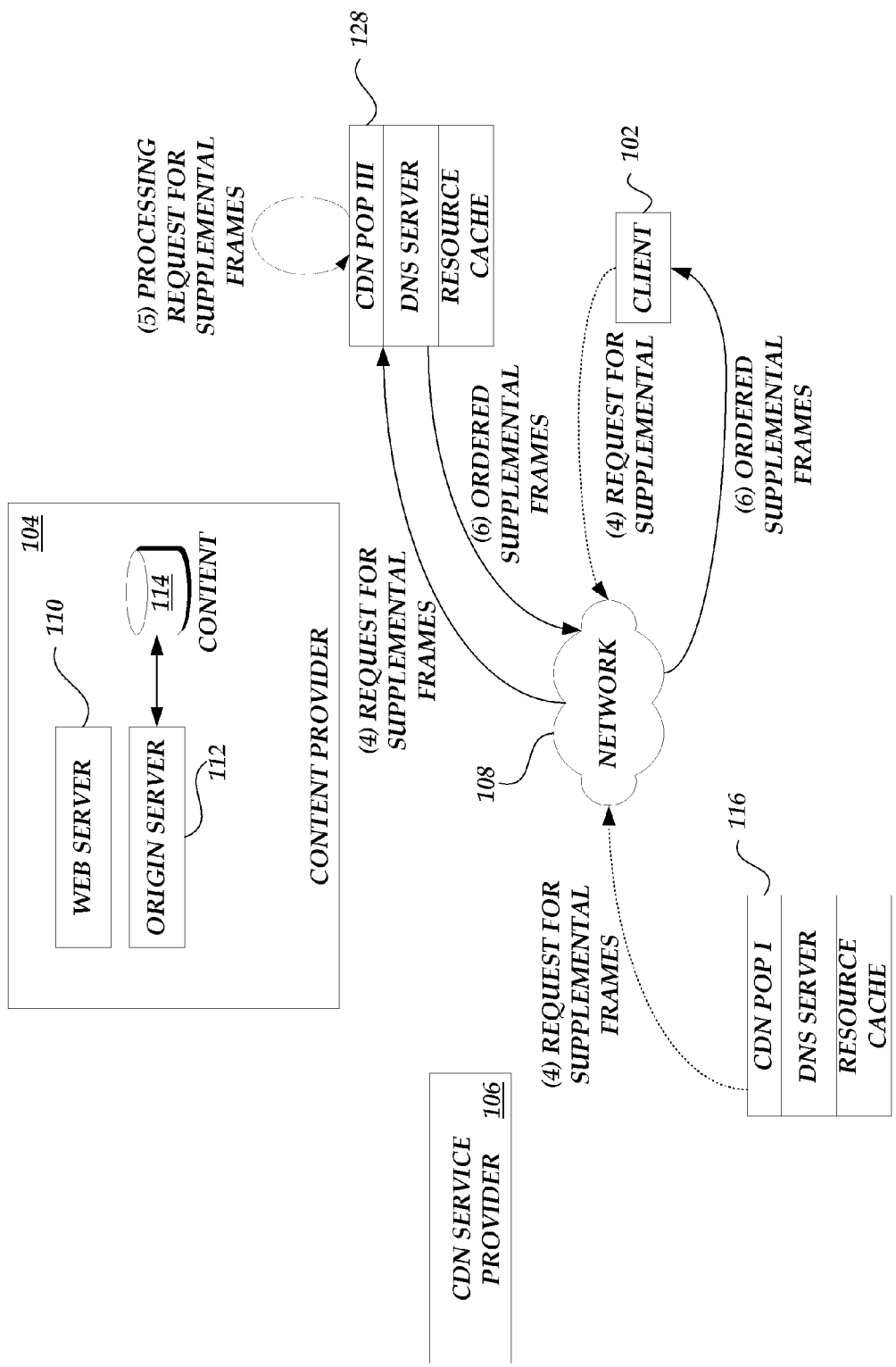

Turning to FIG. 6B, in one embodiment, the receiving POP 116 can transmit a request to the identified alternative POP, illustratively POP 128, or alternative POPs, requesting the transmittal of the supplemental frames to the client computing device 102. Alternatively, the client computing device 102 can initiate the request to the alternative POP 128. Upon receipt of the request (either from POP 116 or client computing device 102), the alternative POP 128 processes the request and identifies a subset of the encoded content that corresponds to the requested supplemental frames (or a portion of the supplemental frames if more than one alternative POP is utilized). Additionally, in an illustrative embodiment, the alternative POP 128 can then prioritize the order of the transmittal of the supplemental such that the supplemental frames most likely to be requested/required by the client computing device 102 will be transmitted first. The prioritization of the subset of encoded frames can be based on historical information related to previous access to the same content by the user or groups of users, previous access to the other content by the user or groups of users, statistical or probabilistic techniques, and the like. The alternative POP 128 transmits the supplemental frames in accordance with the priority. Accordingly, the process illustrated FIGS. 6A and 6B can be repeated until the encoded content is transmitted and stored at the client computing device 102 or until the content is no longer required by the client computing device.

Figure 7:
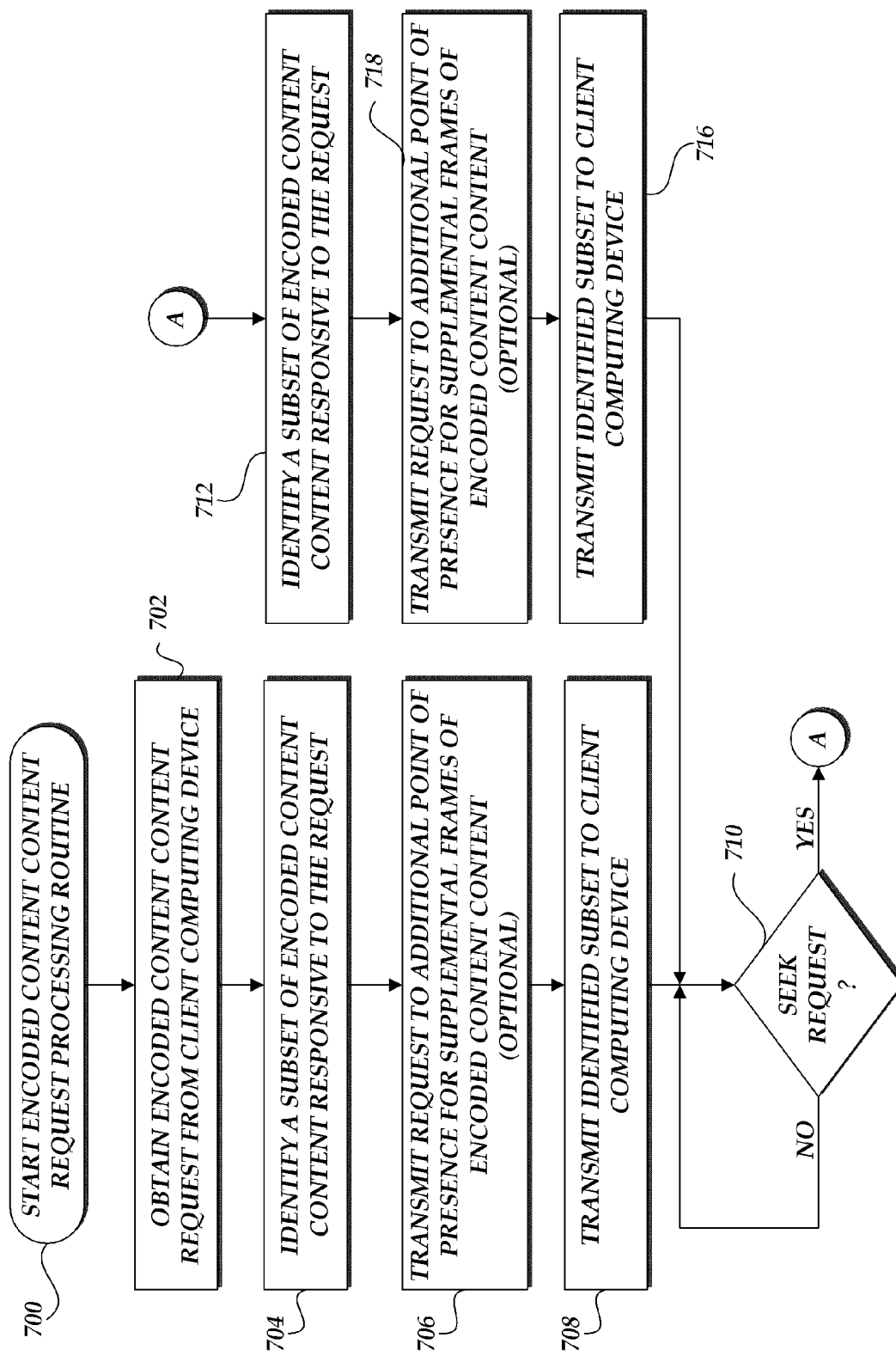
FIG. 7 is a flow diagram of an encoded media content request processing routine implemented by a CDN service provider.

With reference now to FIG. 7, flow diagram of an encoded media content request processing routine 700 implemented by a CDN service provider 106 will be described. Illustratively, routine 700 is illustrated from the perspective of a POP that receives and process the initial request for encoded media. One skilled in the relevant art will appreciate that actions/steps outlined for routine 700 may be implemented by one or many computing devices/components that are associated with the CDN service provider 106. Accordingly, routine 700 has been logically associated as being performed by the CDN service provider 106.

At block 702, one of the client computing devices associated with the CDN service provider 106 obtains a streaming media, or encoded media, request from a client computing device 102. As previously described, the encoded content request can originate from the client computing device 102 from various software applications including media player software application, Web browsing software applications and the like. Additionally, the encoded content request can be transmitted in accordance with any number of network protocols. In an illustrative embodiment and as previously described, a successful resolution of an original URL results in the identification of a network address, such as an IP address, of a DNS server associated with the CDN service provider 106. In this embodiment, the IP address can be shared by one or more POPs. Accordingly, the further DNS query to the shared IP address utilizes a one-to-many network routing schema, such as anycast, such a specific POP will receive the request as a function of network topology. The client computing device request can include a variety of additional information including user or account identifiers, login information, security tokens, and the like.

At block 704, the receiving computing device at the CDN service provider 106 identifies a subset of the encoded content responsive to the request and that can be provided to the client computing device. Illustratively, the subset of the encoded content can corresponds to a selection of at least a portion of the reference frames of the encoded content and some additional frames of the encoded content. The number of frames included in the subset can correspond to a selection of the number of frames that can be transmitted to the client computing device 102 within an established time period or the number of frames the requesting client computing device can process.

At block 706, the receiving computing device at the CDN service provider 106 can optionally transmit a request to one or more additional computing devices at the CDN service provider 106 for supplemental frames of the requested encoded content. The request transmitted by the receiving computing device at the CDN service provider 106 can include an identification of the encoded content, the identification of the identified subset of the encoded frames to be provided by the receiving computing device at the CDN service provider 106, as well as additional information identifying the requesting client computing device 102. At block 708, the receiving computing device at the CDN service provider 106 transmits the identified subset of the encoded to the requesting client computing device 102. In embodiments in which the client computing device 102 requests the supplemental encoded frame information from the additional computing devices at the CDN service provider 106, block 706 may be omitted. Additionally, block 708 may include the transmission of identification information to one or more alternative computing devices at the CDN service provider 106 from the receiving computing device at the CDN service provider 106.

Once the subset of the encoded content is transmitted, the receiving computing device at the CDN service provider 106 may not have any additional information or data to transmit or process responsive to the initial request. At decision block 710, a test is conducted to determine whether the client computing device 102 has transmitted a subsequent request for supplemental frames of the encoded content, such as responsive to a seek request during rendering of the encoded content. If not, the routine 700 returns to decision block 710. Alternatively, if the client computing device 102 has transmitted a subsequent request for supplemental frames of the encoded content, at block 712, the receiving computing device at the CDN service provider 106 identifies a subset of the encoded content responsive to the supplemental request. As described above with regard to block 704, illustratively, the subset of the encoded content can corresponds to a selection of at least a portion of the reference frames of the encoded content and some additional frames of the encoded content. The number of frames included in the subset can correspond to a selection of the number of frames that can be transmitted to the client computing device 102 within an established time period or the number of frames the requesting client computing device can process.

At block 718, the receiving computing device at the CDN service provider 106 can optionally transmit a second request to one or more additional computing devices at the CDN service provider 106 for supplemental frames of the requested encoded content. As described above with regard to block 706, the request transmitted by the receiving computing device at the CDN service provider 106 can include an identification of the encoded content, the identification of the identified subset of the encoded frames to be provided by the receiving computing device at the CDN service provider 106, as well as additional information identifying the requesting client computing device 102. At block 716, the receiving computing device at the CDN service provider 106 transmits the identified subset of the encoded to the requesting client computing device 102. In embodiments in which the client computing device 102 requests the supplemental encoded frame information from the additional computing devices at the CDN service provider 106, block 712 may be omitted. The routine 700 then returns to decision block 710 to determine whether additional user actions/commands are received.

Figure 8:
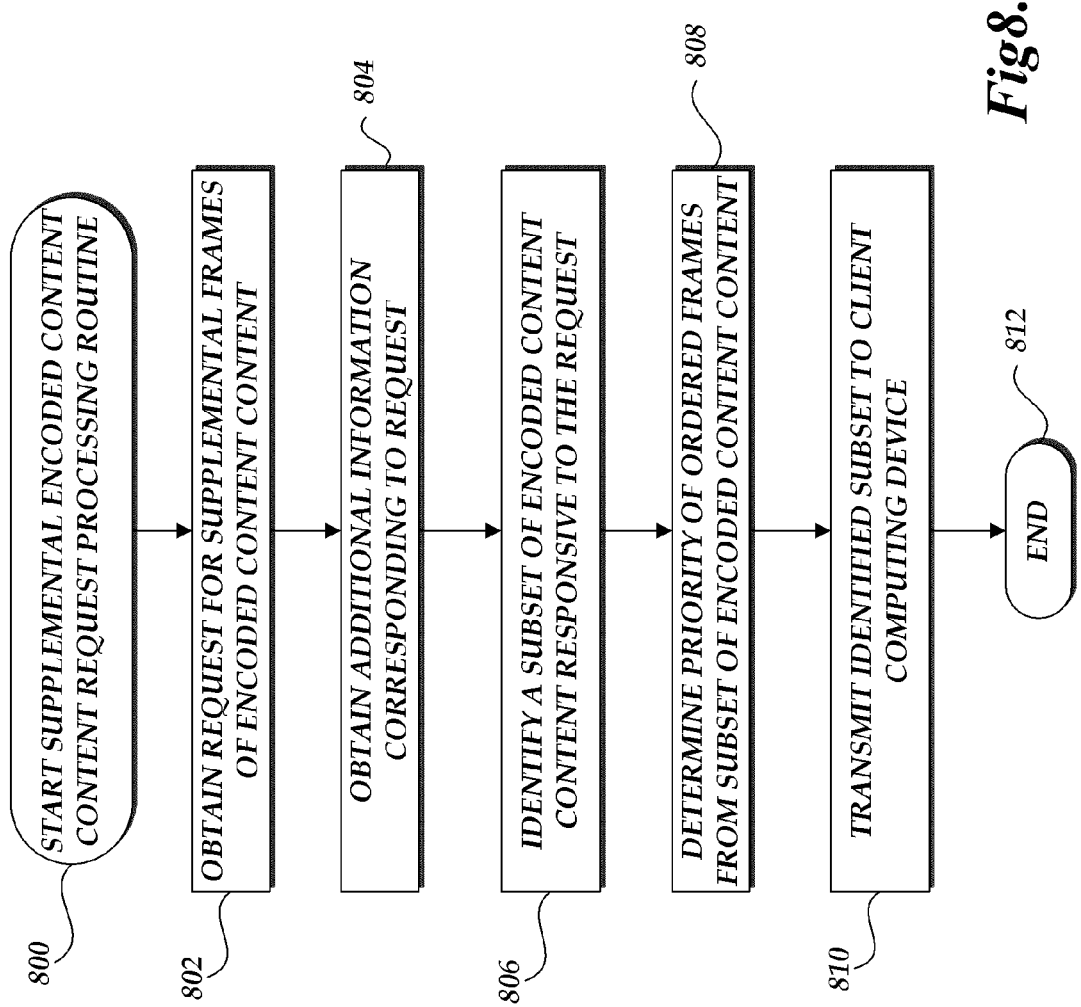
FIG. 8 is a flow diagram of a supplemental encoded media content request processing routine implemented by a CDN service provider.

With reference now to FIG. 8, a flow diagram of a supplemental encoded media content request processing routine 800 implemented by a CDN service provider 106 will be described. Illustratively, routine 800 is illustrated from the perspective of a POP that receives and process the supplemental request for encoded media (e.g., the alternative POP). One skilled in the relevant art will appreciate that actions/steps outlined for routine 800 may be implemented by one or many computing devices/components that are associated with the CDN service provider 106. Accordingly, routine 800 has been logically associated as being performed by the CDN service provider 106.

At block 802, one of the computing devices associated with the CDN service provider 106 obtains a request for supplemental frames of the encoded content. In one embodiment, the request for supplemental frames may be obtained directly from a client computing device 102. In another embodiment, the request for supplemental frames may be obtained from an original receiving computing device at the CDN service provider 106. The request can include various information including information identifying user accounts, the original receiving computing device at the CDN service provider 106, the frames to be provided by the receiving computing device at the CDN service provider 106, and the like. At block 804, the computing device obtains any additional information that will be utilized to select the subset of the supplemental frames of the encoded content or to priority the transmission of the subset. Examples of the additional information can include, but are not limited to, information identifying historical access/rendering of the requested encoded content, information identifying historical access/rendering of groups of content, user profile information, group profile information, etc.

At block 806, the computing device identifies a subset of the supplemental frames of the encoded media. Illustratively, the supplemental frames can correspond to any remaining frames not transmitted by the original receiving computing device (FIG. 7). Alternatively, if multiple alternative computing devices are being utilized, the determination of the subset can correspond to the selection of the number of frames that can be transmitted within a fixed time period or the number of frames capable of being processed by the requesting client computing device. At block 808, the computing device prioritizes the subset of the supplemental frames. In one embodiment, the computing device can prioritize the subset of the supplemental frames in accordance with a statistical technique in which frames are selected in an order to reduce the mean distance between the frames previously transmitted (or the beginning) and end last frame of the encoded content (or other reference point). One such technique, referred to as a binary fill in, corresponds to the division of the mean distance to identify the next encoded frame.

In another embodiment, historical information related to habits or experiences with previous renderings of the same encoded content can be utilized. The habits or experiences may be based on a user (or user account) associated with the client computing device 102. Alternatively, the habits or experiences can correspond to groups of users. In this embodiment, although the encoded content includes sequentially ordered frames, the habits or experiences with previous renderings may indicate the tendencies for users to skip some frames or advance the rendering of content to specific frames. Accordingly, in this embodiment, the computing device can prioritize any frames in accordance such historical information.

In a similar light, in a further embodiment, historical information related to habits or experiences with previous renderings of the other encoded content can be utilized. The habits or experiences may be based on a user (or user account) associated with the client computing device 102. Alternatively, the habits or experiences can correspond to groups of users. In this embodiment, the habits or experiences with previous renderings of other encoded content may also indicate the tendencies for users to skip some frames or advance the rendering of content to specific frames. Accordingly, in this embodiment, the computing device can prioritize any frames in accordance such historical information.

One skilled in the relevant art will appreciate that the above techniques may be combined by the computing device. Additional alternative statistical, historical or probabilistic techniques may also be incorporated to assist in the prioritization of the subset of frames. At block 810, the computing device transmits the identified subset to the client computing device. At block 812, the routine 800 terminates.

Figure 9:
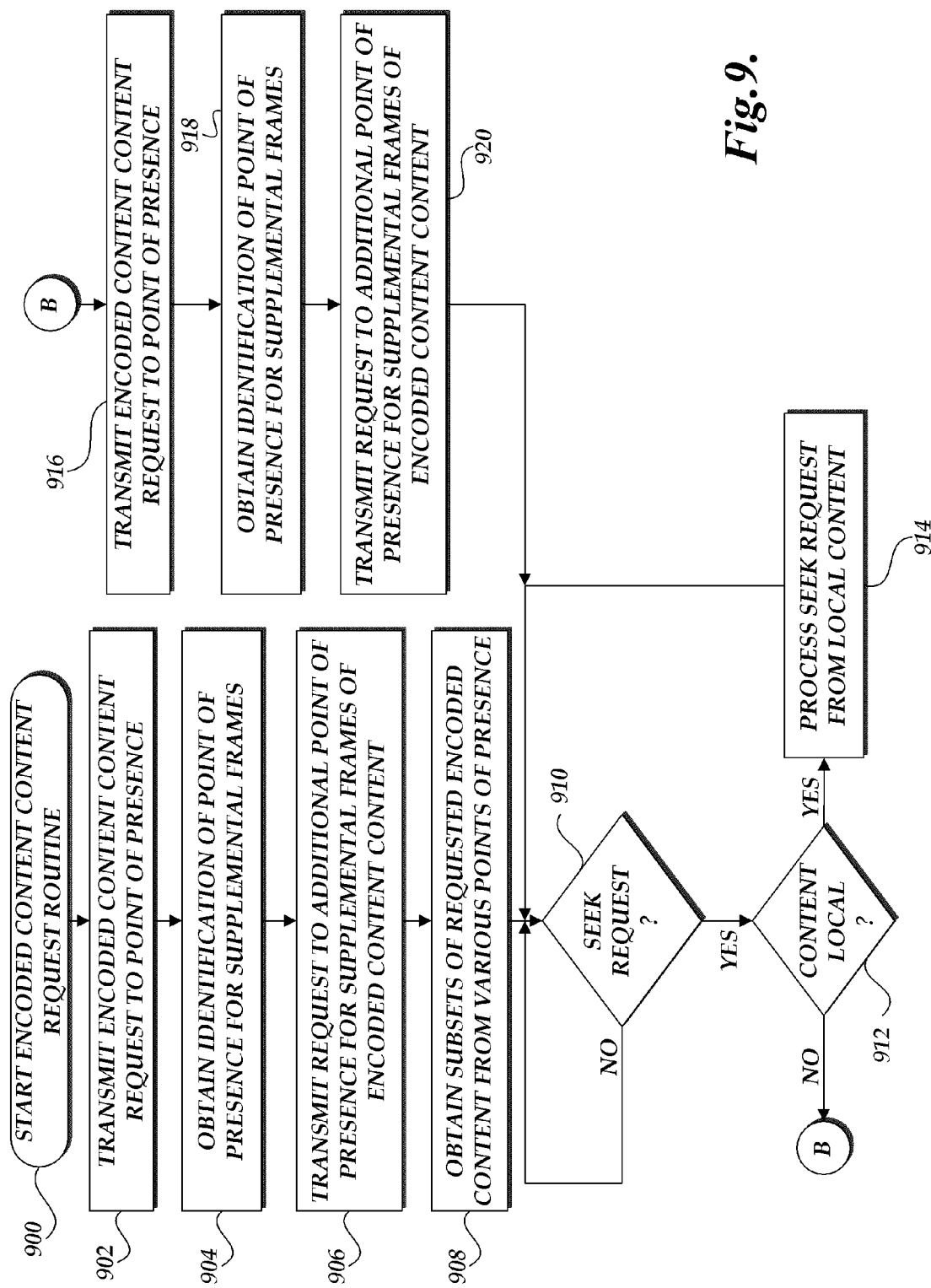
FIG. 9 is a flow diagram of an encoded media content request routine implemented by a client computing device.

With reference now to FIG. 9, a flow diagram of an encoded content request routine 900 implemented by a client computing device 102 will be described. At block 902, the client computing device 102 transmits an encoded content request to an original computing device associated with the CDN service provider 106. The request can include a variety of information for identifying a user (or user account), the client computing device 102, the requested content, the content provider 104 and the like. At block 904, the client computing device 102 optionally obtains the identification of alternative POPs that will be utilized to transmits supplemental frames of the encoded content. At block 906, the client computing device 102 transmits a request for supplemental frames to one or more additional POPs. At block 908, the client computing device 102 obtains frames of the encoded content from at least two POPs responsive to the requested content.

At decision block 910, a test is conducted to determine whether a user associated with the client computing device 102 has indicated a request for additional content, such as a seek request. If not, the routine 900 returns to decision block 910. Alternatively, the client computing device 102 determines at decision block 912 whether the requested content (or reference frame) has already been transmitted to the client computing device 102 and maintained by the client computing device for rendering. If so, the client computing device 102 provides the supplemental content from local storage, such as temporary memory, rendering buffers, and the like.

Alternatively, if requested content has not been transmitted or is otherwise unavailable, at block 916, the client computing device 102 transmits a supplemental request for encoded content request to an original computing device associated with the CDN service provider 106. The request can include a variety of information for identifying a user (or user account), the client computing device 102, the requested content, the content provider 104 and the like. At block 918, the client computing device 102 optionally obtains the identification of alternative POPs that will be utilized to transmits supplemental frames of the encoded content. At block 920, the client computing device 102 transmits a request for supplemental frames to one or more additional POPs. The routine 900 then returns to decision block 910 to determine whether additional user interaction has been received.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for request routing comprising:
    a first network point of presence associated with a content delivery network service provider, wherein the first network point of presence is operable to:
        obtain a request corresponding to encoded content; and
        transmit a first subset of the encoded content;
    a second network point of presence associated with the content delivery network service provider, wherein the second network point of presence is operable to:
        obtain a second request corresponding to the encoded content, the second request corresponding to a second subset of the encoded content including at least some portion of the encoded content not previously included in the first subset of the encoded content;
        prioritize at least a portion of the encoded content included in the second subset based, at least in part, on historical information;
        determine a transmitting order for the encoded content included in the second subset, based, at least in part, on the prioritization; and
        transmit the second subset of the encoded content.

2. The system of claim 1, wherein the second request is transmitted by at least one of the first network point of presence or a client computing device.

3. The system of claim 1, wherein the historical information comprises information indicating historical access of the encoded content by one or more users.

4. The system of claim 3, wherein the encoded content is sequential and the information indicating historical access of the encoded content by one or more users comprises an indication that the sequential encoded content is accessed out of sequence by the one or more users.

5. The system of claim 1, wherein the encoded content is defined by a series of ordered frames including a number of reference frames within the encoded content.

6. The system of claim 5, wherein determining the transmitting order for the sequentially series of ordered frames included in the second subset includes:
    determining a current frame position and an ending frame position; and
    identifying a frame having a mean position between the current frame position and the ending frame position; and
    adding the identified frame into the transmitting order.

7. A method for processing content requests comprising:
    obtaining, by a content delivery network service provider, a request corresponding to encoded content;
    transmitting, by the content delivery network service provider, a first subset of the encoded content;
    obtaining, by the content delivery network service provider, a second request corresponding to the encoded content, the second request corresponding to a second subset of the encoded content including at least a portion of the encoded content not previously included in the first subset;
    prioritizing, by the content delivery network service provider, a portion of the encoded content in the second subset based, at least in part, on historical information;
    determining, by the content delivery network service provider, a transmitting order for the encoded content in the second subset based, at least in part on the prioritization; and
    transmitting, by the content delivery network service provider, the second subset of the encoded content in accordance with the transmitting order.

8. The method of claim 7, wherein the second request is transmitted by at least one of a first point of presence or a client computing device.

9. The method of claim 7, wherein the first request and the second request is associated with a user.

10. The method of claim 7, wherein the historical information is associated with previous access to the encoded content by at least one of a user requesting the content or a group of users requesting the content.

11. The method of claim 7, wherein the historical information is associated with previous access to encoded content different than the requested encoded content by at least one of a user requesting the content or a group of users requesting the content.

12. The method of claim 7, wherein the encoded content is defined by a series of sequentially ordered frames including a number of reference frames.

13. The method of claim 12, wherein the second subset of frames includes at least one reference frame of the encoded content.

14. The method of claim 12, wherein the transmitting order comprises a transmitting order of the second subset of frames, wherein the transmitting order of the second subset of frames is a different sequence than the sequence of the series of sequentially ordered frames.

15. A nontransitory computer-readable medium comprising computer-executable instructions stored thereon that, when executed in one or more processors, are configured to execute operations comprising:
- obtaining, by a content delivery network service provider, a request corresponding to encoded content;
- transmitting, by the content delivery network service provider, a first subset of the encoded content;
- obtaining, by the content delivery network service provider, a second request corresponding to the encoded content, the second request corresponding to a second subset of the encoded content including at least a portion of the encoded content not previously included in the first subset;
- prioritizing, by the content delivery network service provider, a portion of the encoded content in the second subset based, at least in part, on at least one of statistical, probabilistic or historical information;
- determining, by the content delivery network service provider, a transmitting order for the encoded content in the second subset based, at least in part on the prioritization; and
- transmitting, by the content delivery network service provider, the second subset of the encoded content in accordance with the transmitting order.

16. The computer-readable medium of claim 15, wherein prioritizing a portion of the encoded content is configured to reduce latencies associated with the delivery of the encoded content to a user computing device.

17. The computer-readable medium of claim 15, wherein the encoded content is defined by a series of sequentially ordered frames including a number of reference frames.

18. The computer-readable medium of claim 17, wherein determining the transmitting order for the series of sequentially ordered frames included in the second subset includes:
- determining a current frame position and an ending frame position; and
- identifying a frame having a mean position between the current frame position and the ending frame position; and
- adding the identified frame into the transmitting order.

19. The computer-readable medium of claim 18, wherein the current frame position corresponds to at least one of a current rendering position and a last transmitted frame.

20. The computer-readable medium of claim 18, wherein ending frame position corresponds to at least one of a last frame in the encoded content and a last transmitted frame.

* * * * *